(12) United States Patent
Oakes et al.

(10) Patent No.: US 9,334,686 B2
(45) Date of Patent: May 10, 2016

(54) INTEGRATED SECURITY BARRIER CONTROL SYSTEM

(71) Applicant: Intellimar, Inc., Sykesville, MD (US)

(72) Inventors: Mark Odell Oakes, Sykesville, MD (US); Matthew Joseph Roland, Sykesville, MD (US); John David Bray, Sykesville, MD (US); Vebi Livoreka, Sykesville, MD (US)

(73) Assignee: Intellimar, Inc., Sykesville, MD (US)

( * ) Notice: Subject to any disclaimer, the term of this patent is extended or adjusted under 35 U.S.C. 154(b) by 0 days.

(21) Appl. No.: 14/329,561

(22) Filed: Jul. 11, 2014

(65) Prior Publication Data

US 2015/0016882 A1    Jan. 15, 2015

Related U.S. Application Data

(60) Provisional application No. 61/845,194, filed on Jul. 11, 2013.

(51) Int. Cl.
*E06B 9/00* (2006.01)
*G05B 19/042* (2006.01)

(52) U.S. Cl.
CPC .............. *E06B 9/00* (2013.01); *G05B 19/0428* (2013.01); *G05B 2219/24211* (2013.01); *G05B 2219/2628* (2013.01)

(58) Field of Classification Search
CPC ........... E01F 15/00; E01F 15/20; E01F 13/06; E01F 13/048; E01F 13/123
See application file for complete search history.

(56) References Cited

U.S. PATENT DOCUMENTS

| | | | |
|---|---|---|---|
| 5,288,164 A | 2/1994 | Nasatka | |
| 8,439,594 B1 * | 5/2013 | Clark et al. | 404/6 |
| 2005/0201827 A1 * | 9/2005 | Rastegar et al. | 404/6 |
| 2005/0206519 A1 | 9/2005 | Tsui et al. | |
| 2012/0146763 A1 | 6/2012 | Teti et al. | |
| 2013/0117078 A1 | 5/2013 | Weik, III et al. | |
| 2013/0207776 A1 * | 8/2013 | Christianson et al. | 340/5.51 |
| 2015/0033629 A1 * | 2/2015 | Barwick et al. | 49/13 |

* cited by examiner

*Primary Examiner* — Abigail A Risic
(74) *Attorney, Agent, or Firm* — Kristin Mazany Nevins; Offit Kurman

(57) ABSTRACT

Described here is an integrated control system for crash-rated barriers and bollards, barrier products and software which will improve the operational safety characteristics of the barriers and ancillary equipment; identify potential security breaches of the barrier operating system, and predict potential failures in the system. Crash rated barriers and bollards are used to prevent a vehicle attempting to penetrate the secure perimeter of a facility with malicious intent. Installation and operation of crash rated barriers is utilized to protect both government, commercial and private facilities against such threats. Simultaneously it allows ingress and egress to the facility resulting in the end user having to determine tradeoffs for security versus safety. The barriers described here are designed and certified to withstand attacks from heavy vehicles traveling at high rates of speed. The system, products and software will allow for reporting of potential failures within the system while simultaneously using configurable control and activation of the equipment to override such failures and allow for safe and secure operation of the barrier system until maintenance or repairs can be performed.

6 Claims, 2 Drawing Sheets

INTEGRATED SECURITY BARRIER CONTROL SYSTEM

BACKGROUND

1. Field of the Invention

This invention relates to security barriers and their electronic control and monitoring systems.

2. Background of the Invention

Crash rated barriers and bollards are used to provide an officer with a device to prevent a vehicle attempting to penetrate the secure perimeter of a facility with malicious intent. Installation and operation of crash rated barriers is utilized to protect both government, commercial and private facilities against such threats. Simultaneously it allows ingress and egress to the facility resulting in the end user having to determine tradeoffs for security versus safety. The barriers are designed and certified to withstand attacks from heavy vehicles traveling at high rates of speed; which could result in catastrophic damage to the vehicle and potential injury or death to its occupant(s). However; the barriers and their control systems are not able to distinguish a threat vehicle from a non-threat vehicle. While the barrier manufacturers provide for certain safety features to help prevent improper activation of the barrier or bollard, such features are not always reliable. Furthermore; the barrier control systems provided by the manufacturers are designed and programmed to simply activate the barrier to move from the unsecure position to the secure position and vice versa regardless of the existing conditions. Existing barrier manufacturers utilize certain equipment including limit switches, pressure gauges, and loop detector modules to provide their control system with inputs by which to determine barrier position and thus proper activation of the barriers. However; such components are subject to failure resulting in improper or incomplete operation of the barrier. While most manufacturers provide a preventative maintenance schedule for inspection and/or replacement of equipment or components, such maintenance schedules generally cannot help predict potential failure of the equipment.

There exists a need to provide an overall integrated control system which will predict potential failures in barriers, while simultaneously using control of the equipment to allow for safe and secure operation of the barrier system until maintenance or repairs can be performed.

SUMMARY OF THE INVENTION

The present invention is drawn to the management and interface of crash rated barrier programmable logic controller software and equipment hardware that provides for improved barrier safety, security, diagnostics, reporting, and predictive maintenance. The invention includes barrier products, software and systems that allow the management and interface of crash rated barrier programmable logic controller software and equipment and provides for improved barrier safety, security, diagnostics, reporting, and predictive maintenance.

DETAILED DESCRIPTION OF THE INVENTION

Figure 1:
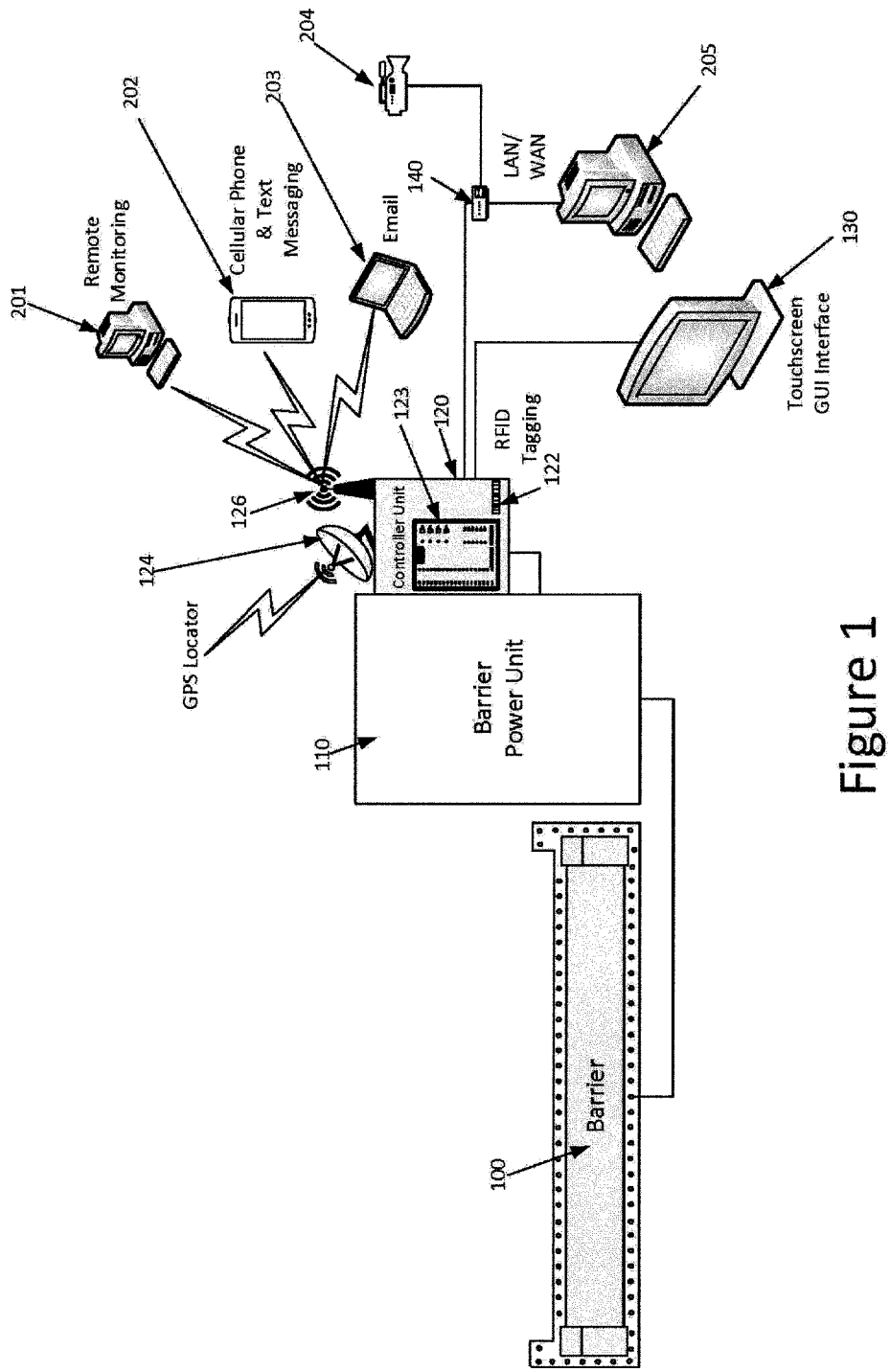
FIG. 1 represents a general arrangement of the integrated security barrier control system of the invention and how all the various components interface with each other.

The present invention provides an overall integrated barrier control system, barrier products and software which will improve the operational safety characteristics of the barriers and ancillary equipment; identify potential security breaches of the barrier operating system, and predict potential failures in the system allowing for reporting of such failures while simultaneously using configurable control and activation of the equipment to override such failures and allow for safe and secure operation of the barrier system until maintenance or repairs can be performed.

While the system provides more enhanced features and functions to crash rated barriers, the system is also designed to accommodate non-crash rated/traffic control barriers. Without limiting the scope of the invention, the term "barrier" is used to represent any of the typical barriers whether they are wedge barriers, drops arms, bollards, swing gates, cantilevered gates, horizontal beam barriers, and the like; and regardless if the power control unit is hydraulically operated, pneumatically operated, electrically operated or operated in any way configured by the user or manufacturer.

The invention integrates programmable logic controllers (PLC), monitoring devices, and reporting devices into an integrated security barrier control system which makes logical decisions through pre-programmed logic trees to (i) correct the operation of the barriers (regardless of commands given by the operator); (ii) issue warnings and alarms prioritized by customer needs providing information when requested actions have not been performed, and (iii) provide warnings and alternate operational conditions based upon component failures or potential component failures allowing for predictive maintenance.

Additional monitoring devices such as limit switches, pressure transducers, temperature gauges, amperage gauges, low level indicators, and the like, are added at appropriate points to the manufactures standard power units and barrier systems to allow for monitoring of the various conditions or "health" of the barrier. While some integrators and manufacturers provide individual readout of alarms for these individual components no one is currently looking at all of the various components as a system to analyze the true condition of the barrier operating system and using that information to predict potential upcoming failure conditions, or to pre-empt operational problems. Under this invention, existing PLCs are re-programmed, replaced, or expanded to accommodate the added devices and then programmed with a security code to analyze the inputs and perform functions or initiate alarms based upon logical decision trees imbedded in the code. Graphic User Interface (GUI) touchscreen control panels are also installed or reprogrammed to accommodate the visual displays, alarms, and status screens associated with the computer code revisions. These features and functions are designed to improve barrier safety, security, and diagnostics through reporting and predictive maintenance.

Safety is improved by not only monitoring the barrier components relative to the barrier commands and anticipated barrier movement, but also by monitoring movement of the vehicle as it passes through the protected roadway. Based upon computer code logic, the software of the system is programmed to help ensure the safety of the vehicle and its occupants by performing various system logic including (i) auto-reverse the barrier when the system detects that the barrier has moved from the unsecure position without activation by the officer or control system GUI panels or control buttons, while simultaneously alarming the user that the system has malfunctioned and exactly what the nature of the malfunction was; (ii) delay the securing of the barrier if a vehicle is not detected by the system as having left the protected area; (iii) alarming the officer on duty when anticipated action did not occur such as the barrier failing to open or close upon command; (iv) providing maintenance modes where maintenance personnel can work on the equipment without danger of the system being activated by the user, or a combination thereof.

Security is improved by not only monitoring the barrier components relative to the barrier commands and anticipated barrier movement, but also by monitoring movement of the vehicle as it passes through the protected roadway. Based upon computer code logic, the software of the system is programmed to help ensure security of the access control point by performing various system logic including (i) alarming when a vehicle has been stopped in the path of the barrier for an extended period of time blocking the barrier from being able to be secured; (ii) alarming when a barrier has been in the open/unsecure position for an extended period of time resulting in the access control point not being properly secured; (iii) alarming when a barrier automated function such as free exit has failed to perform properly; (iv) alarming when the system detects vehicles moving through the roadway in a manner which is out of sequence with the expect flow of traffic; (v) alarming when a barrier has failed to return to the secure position after activation by the officer or control system GUI panels or control buttons; (vi) incorporating redundant systems to detect position of the barrier such that failure of one system will not impede the operation of the barrier, while simultaneously alarming the user that the system has malfunctioned and exactly what the nature of the malfunction was; (vii) programming the system for various alarm or lockdown conditions based upon activation of tamper switches, off-hours activation, gate crashes, threat levels, or a combination thereof.

Diagnostics are improved by providing the user with visual and audible indication of system component operational condition and/or failure along with system status screens of monitored and tracked information. Some integrators provide data logging of inputs and outputs of the control system to be used during post mortem problem investigation. While data logging is a part of the integrated security barrier control system of the invention, the integrated security barrier control system provides real time reporting and prioritized alarms. Manufacturers of the barriers provide a preventative maintenance schedule used to identify periodic maintenance based upon expected time frames for failures. The integrated security barrier control system uses programming code to provide a predictive maintenance program which monitors the ongoing performance of system components to determine if they are beginning to show signs of failure or the need for maintenance. Predictive analytics detect anomalies and failure patterns to evaluate component risk of failure and flag maintenance requirements. Diagnostic and predictive maintenance features include (i) visual indication of vehicles traveling through the protected area based upon activation of vehicle loop sensors to help diagnosis whether or not the loop modules are operating correctly; (ii) continual monitoring of incoming voltages, motor amperage draw, battery status etc. to alarm of impending problems, and/or allow for override of the system to maintain continued operation or perform automatic shutdown procedures to protect against damage; (ii) continual monitoring of hydraulic pressures and flow to alarm of impending failures and to report leaks, blow outs, or mechanical binding and/or to perform automatic shutdown procedures to protect against damage; (iii) continual monitoring of temperatures of hydraulic oil, motors, and enclosures to provide alarm of impending failure and/or to perform automatic shutdown procedures to protect against damage; (iv) monitoring and reporting energy usage to help determine operational costs, (v) provide predictive maintenance screens and notification of expected or required maintenance or a combination thereof.

Reporting functions include programmed GUI touchscreen dashboards which show real time conditions of monitored outputs including voltages, barrier position, pressures, temperatures, valve position, oil quality, and the like, and provide historical information on cycle counts, motor runtime, high and low pressures, voltages, failures, alarms, spring tension problems, and the like. Such information is logged into the system to report lifetime usage to predict and budget end of life cycle and replacement programs. The system stores maintenance and repair logs for future access and review. The reporting function information includes original manufacturing information, installation information, contact information, maintenance history logs, asset tracking, etc. that are readily accessible through RFID readers or with GPS locators on clickable Internet mapping functions, or a combination thereof. GPS locators are utilized to monitor weather conditions in the area of the barrier to warn against pending severe weather conditions that might affect barrier operation (flooding, ice, lightning, etc.).

The system of the invention also contains remote reporting capabilities including signal processor/transmission devices utilized to notify call centers, send emails, send text messages, etc. of predefined alarm conditions. The remote capability also allows system's operation to be monitored offsite by personnel for multi-location operations or to be monitored offsite by a third-party concern on behalf of the end user. The system can also be tied into LAN and WAN for local and offsite control, monitoring and alarms.

The system is designed to be used as a bolt on to existing systems or as an OEM replacement unit and can be provided with a base unit that can be upgraded via a subscription based program with various tiers of capabilities and functions. The system can also be interfaced with video surveillance systems to provide real time barrier data and operation with date and time stamped information which can synchronized with video for accident investigation.

The invention includes software which improves the operational safety characteristics of security barriers and ancillary equipment; enables identification of potential security breaches of a barrier operating system, and predict potential failures in a barrier system, allowing for reporting of such failures while simultaneously using configurable control and activation of the equipment to override such failures and allow for safe and secure operation of the barrier system until maintenance or repairs can be performed.

The invention also includes products which improve the operational safety characteristics of security barriers and ancillary equipment; enables identification of potential security breaches of a barrier operating system, and predict potential failures in a barrier system, allowing for reporting of such failures while simultaneously using configurable control and activation of the equipment to override such failures and allow for safe and secure operation of the barrier system until maintenance or repairs can be performed. Such products can include security barrier products with integrated software and control systems. Additionally, the products of the invention include products depicted in FIG. 1 and any derivations of such products thereof.

FIG. 1 illustrates how the components of the integrated security barrier system of the invention interact. The barrier 100 is powered by the barrier power unit 110, which is controlled by a controller unit 120 which could be located in proximity to the barrier power unit, or in a remote location. The Interface board 123 is located in the controller unit 120.

Optionally, the power unit may have RFID tagging 122, a GPS locator unit 124, and/or a Wi-Fi transmitter 126 or other hard-wired means of communication with remote devices and/or through the internet or intranet systems. Peripherals include remote monitoring 201 via a workstation, cellular or modular device monitoring and/or text messaging 202, or email 203 communications. Additionally, a router or other device 140 that can connect LAN/WAN network devices 205, and/or camera 204 monitoring or video surveillance system. The controller unit 120 may also be controlled directly via a touchscreen GUI interface display monitor or other device 130.

Figure 2:
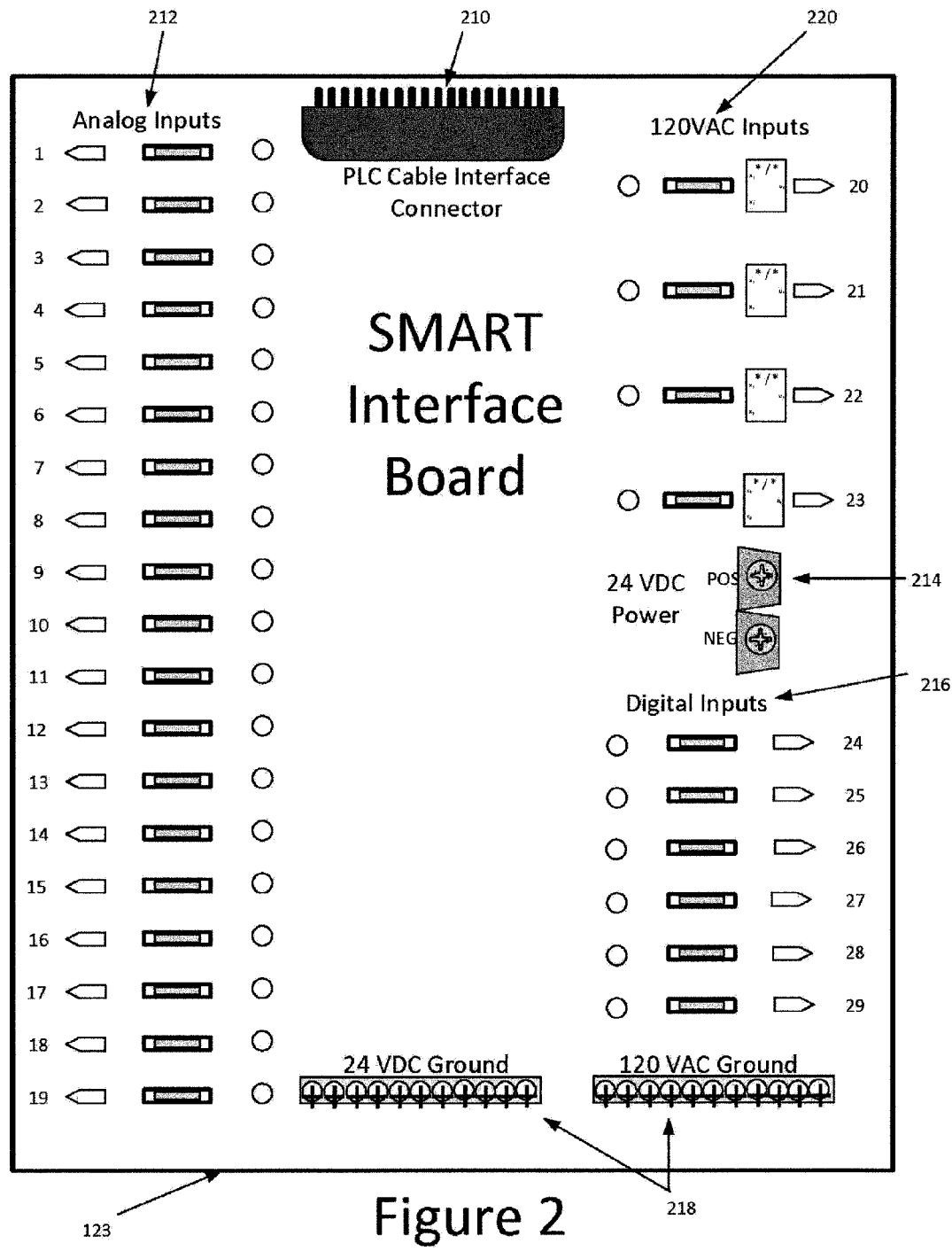
FIG. 2 represents an interface board used to standardize termination and interface of the various components monitored and controlled by the integrated security barrier system.

FIG. 2 depicts an integrated security barrier interface board 123 utilized to standardize termination and interface of the various components monitored and controlled by the integrated security barrier system. The board is designed to accommodate high 220 and low 214 voltage inputs, both analog 212 and digital 216. The board also provides surge protection and indicators such as LED, sound, and the like, which are integrated into the circuitry of the board and this not shown. The board also provides grounding terminal 218 for both inputs. The board is tied directly to the integrated security barrier PLC system by an interface connector 210 to interface with monitored devices and inputs.

Having now fully described this invention, it will be understood to those of ordinary skill in the art that the same can be performed within a wide and equivalent range of conditions, formulations, and other parameters without affecting the scope of the invention or any embodiment thereof. All patents and publications cited herein are incorporated by reference in their entirety.

We claim:

1. An integrated barrier control system comprising;
   a barrier system comprising at least a barrier device, barrier power unit, and a controller unit;
   said controller unit comprising a programmable logic controller, monitoring device, reporting device, and a user interface control panel to accommodate a visual displays, an alarm, and/or status screen; the controller unit being capable of making logical decisions through pre-programmed logic trees to (i) correct the operation of the barriers independent of commands given by an operator: (ii) issue warnings and alarms prioritized by a customer and providing information when requested actions have not been performed, and (iii) provide warnings and alternate operational conditions based upon component failures or potential component failures; and
   said barrier power unit comprising RFID tagging, a GPS locator unit, a Wi-Fi transmitter and/or a hard-wired means of communication with remote devices and/or through intranet systems; and
   wherein said integrated barrier control system identifies potential security breaches of the barrier operating system and/or a component of the barrier system, and predicts potential failures in the integrated barrier control system while simultaneously overriding such potential failures, and providing remote monitoring information to the operator.

2. The integrated barrier control system of claim 1, wherein the remote monitoring is downloaded to a workstation, cellular device, or modular device; or via text messaging, or email communications.

3. The integrated barrier control system of claim 1 further comprising a remote monitoring device, a reporting device, a signal processor/transmission device capable of notifying call centers, sending emails and text messages of pre-defined alarm conditions to a remote location.

4. The integrated control system of claim 1 further comprising a video surveillance system.

5. Software of the integrated barrier control system of claim 1, wherein the software identifies potential security breaches of the barrier system, predicts potential failures of the harrier system, report such failures to an operator while simultaneously using a configurable control of the barrier system to override such failures.

6. The barrier system of claim 1, the barrier device selected from the group consisting of: a wedge barrier, a drops arm, a bollard, a swing gate, a cantilevered gate, and a horizontal beam barrier.

* * * * *